March 21, 1967 R. C. HUTSON 3,310,333
REACH PENDANT FOR ATTACHING EXTERNAL CARGO
TO A HOVERING AIRCRAFT
Filed Jan. 4, 1966 4 Sheets-Sheet 2
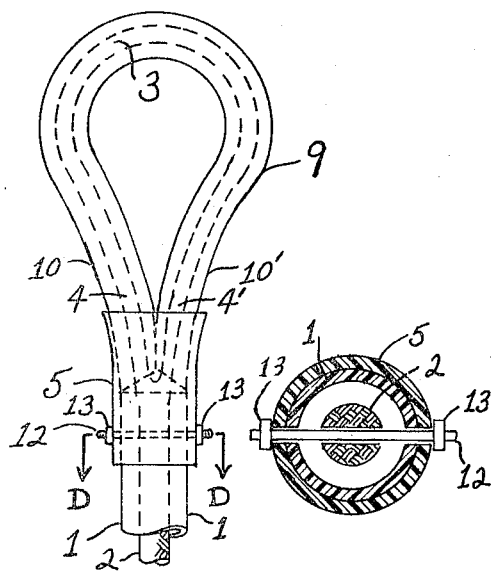
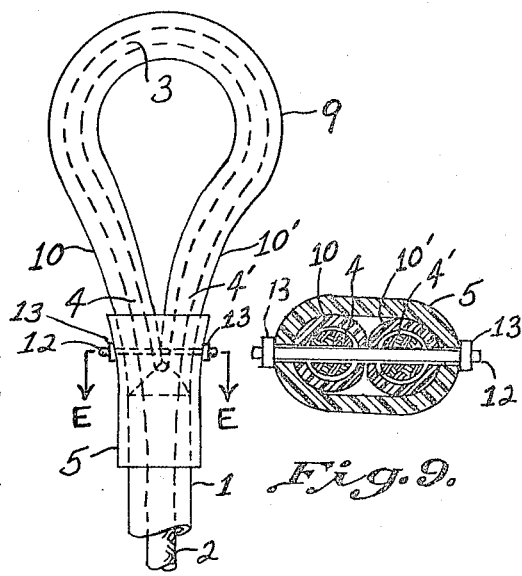
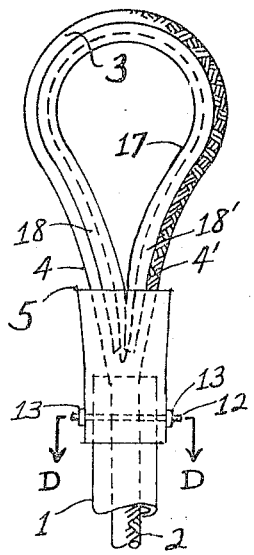
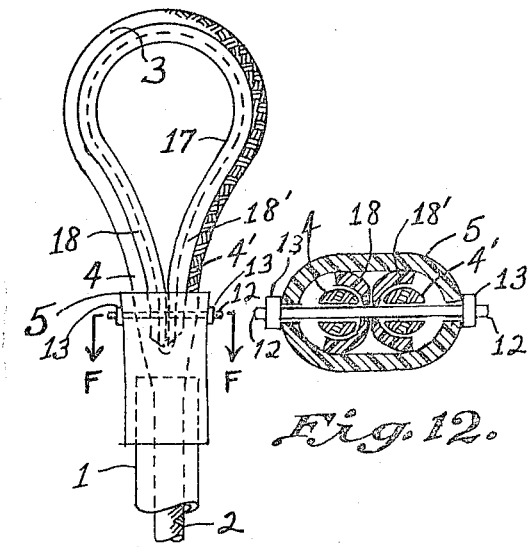
ROBERT C. HUTSON,
INVENTOR.
BY Walter M. Dotts, Jr.
AGENT

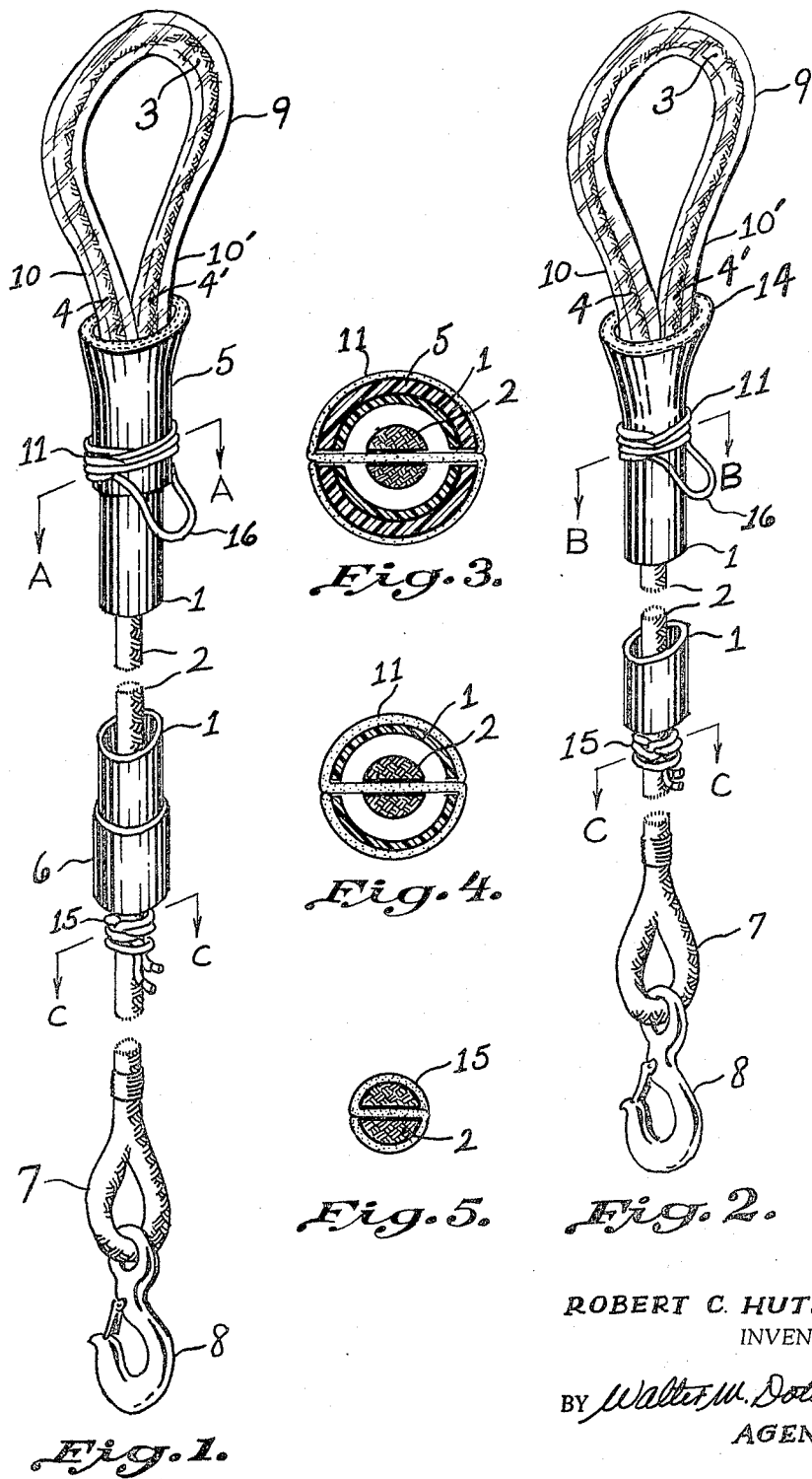

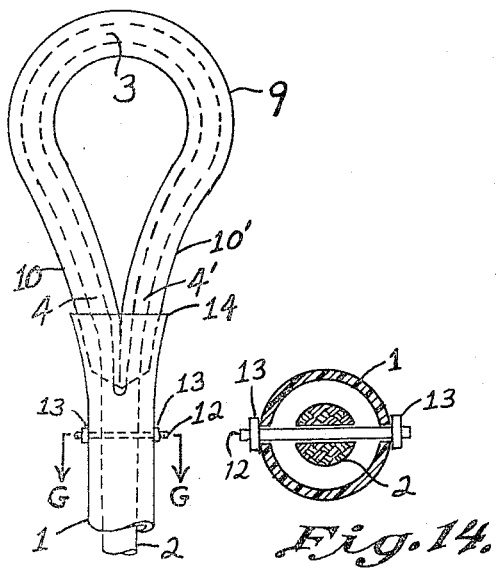
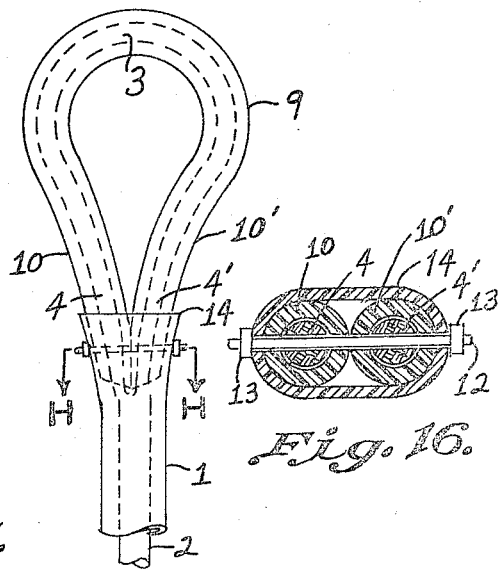
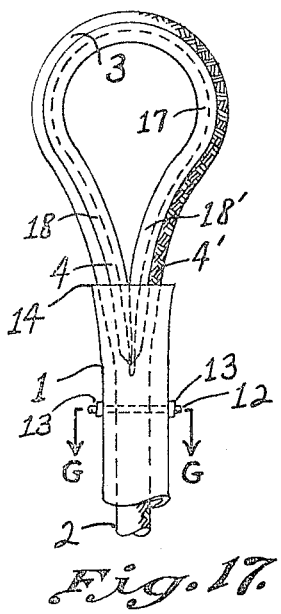
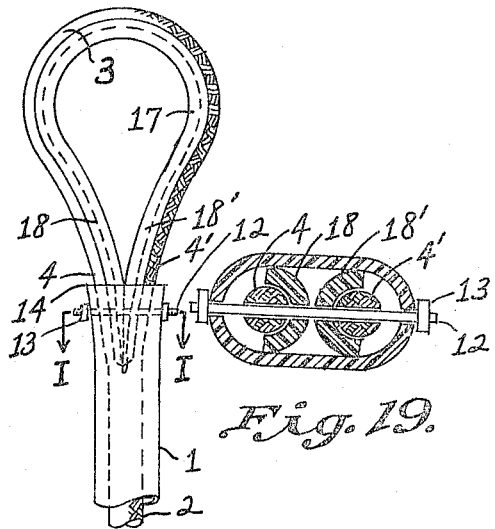
ROBERT C. HUTSON
INVENTOR.
BY Walter W. Dotts, Jr.
AGENT.

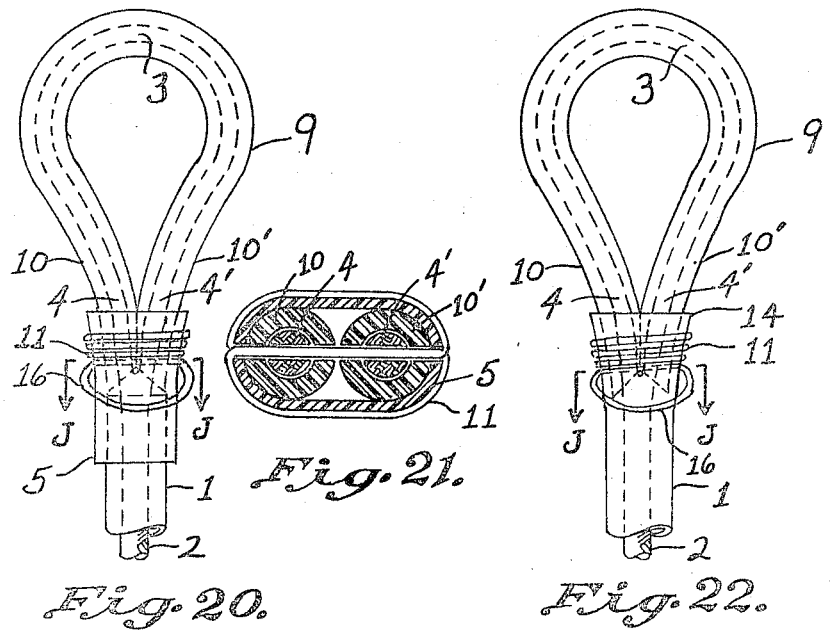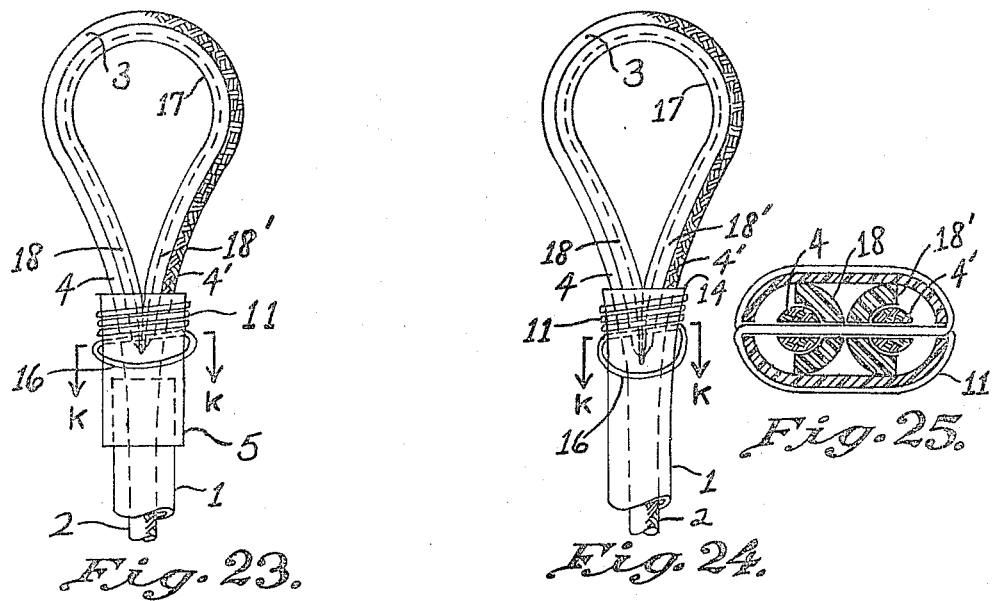

United States Patent Office 3,310,333
Patented Mar. 21, 1967

3,310,333
REACH PENDANT FOR ATTACHING EXTERNAL
CARGO TO A HOVERING AIRCRAFT
Robert Carey Hutson, Diggs, Va.
(Diggs P.O., Mathews, Va. 23045)
Filed Jan. 4, 1966, Ser. No. 518,700
21 Claims. (Cl. 294—78)

This invention relates generally to a cargo attachment device employed to span the distance between the external cargo hook of a hovering aircraft, such as a helicopter, and the slings or bindings which support a cargo to be lifted by the aircraft.

More particularly, this invention relates to a reach pendant comprising a reach housing which is manually employed by a crew member for attaching a cargo safely, easily, and quickly to the external cargo lifting device of an aircraft while that aircraft is hovering above the cargo.

In logistic support of field or sea operations by vertical replenishment methods using hovercraft as the cargo transporting vehicle, it is now conventional practice to lift and transport external, sling-supported cargoes which hang beneath the hovercraft by means of an attachment made to the aircraft's external cargo hook. The link between the aircraft's external cargo hook and the slings or bindings which support the cargo is often a pendant made of flexible line, typically double braided hollow synthetic rope, fitted at one end with a safety hook for snapping into the ring of a conventional cargo sling, and terminated at the other end with an eye for engaging the hovering aircraft's external cargo hook.

The use of such simple cargo pendants to span the distance between the cargo sling and the aircraft's external cargo hook has overcome a major problem encountered in vertical replenishment operations, namely, the avoidance of dangerous oscillation of the external cargo during flight. The winding and unwinding of sling lines which formerly characterized most of the motion in cargo oscillation when the slings were attached directly to the aircraft's external cargo hook, has been minimized by the interposition of a cargo pendant between the slings supporting the cargo and the aircraft's cargo hook. Such cargo pendants function best to avoid cargo oscillation when they are made from torque-free braided lines which have a braided core within a braided cover.

Even after such torque-free cargo pendants were adopted for vertical replenishment use, several serious problems remained unsolved. For example, it is very difficult and much time is wasted when a crew member standing beneath a hovering aircraft attempts to engage a floppy eye in a flexible cargo pendant with the aircraft's external cargo hook. There existed a need for a simple and handy way to support the eye in an erect position and to keep it in an open configuration so that it could easily and accurately be slipped over the cargo hook hanging below the aircraft during hover. A simple means for achieving the combined result of holding the eye erect aloft and maintaining it in an open configuration was not available.

Another problem demanding a solution was the necessity to protect crew members handling the hook-up operation from being seriously shocked or from receiving painful burns caused by discharges of static electricity between the hovering aircraft and ground-based personnel.

The present invention overcomes these problems by providing a non-conducting reach housing in combination with a cargo pendant terminating in a specially supported eye which is automatically maintained in an open configuration when the pendant is not under load. This reach housing protects a crew member from electrical shock and burns, while extending his reach and holding the eye erect and wide open for rapid and accurate engagement with the hovering aircraft's external cargo hook.

Accordingly, it is an object of this invention to provide a non-conducting reach housing enclosing the terminal portion of a cargo pendant adjacent the eye employed to engage an aircraft's external cargo hook.

Another object is to support an eye in a cargo pendant so that it can easily be held in an erect position with the eye automatically maintained in an open configuration when not under tension, thereby facilitating rapid hook-up to a hovering aircraft.

Another object is to provide a simple and effective means for maintaining a reach housing in a fixed relationship to an eye in one end of a cargo pendant without damage during the lifting of heavy cargoes when the pendant is elongated under load.

Additional advantages inherent in the structure of this invention will be apparent from the following description taken in conjunction with the accompanying drawings in which:

FIGURE 1 is a perspective view of a first preferred embodiment of the reach pendant of this invention.

FIGURE 2 is a perspective view of a second preferred embodiment of the invention.

FIGURE 3 is a sectional view taken along line A—A of FIGURE 1.

FIGURE 4 is a sectional view taken along line B—B of FIG. 2.

FIGURE 5 is a sectional view taken along lines C—C of FIGS. 1 and 2.

FIGURE 6 is a diagrammatic drawing of an alternative structure for the upper end of the reach housing of the first preferred embodiment of this invention.

FIGURE 7 is a sectional view taken along lines D—D of FIGS. 6 and 10 showing details of the inner structure.

FIGURE 8 is a diagrammatic drawing of an alternative structure for the upper end of the reach housing of the first preferred embodiment of this invention.

FIGURE 9 is a sectional view taken along line E—E of FIG. 8 showing details of the inner structure.

FIGURE 10 is a diagrammatic drawing of an alternative structure for the eye which is maintained in the upper end of reach housing of the first preferred embodiment of the invention.

FIGURE 11 is a diagrammatic drawing of an alternative structure for the eye and the upper end of the reach housing of the first preferred embodiment of the invention.

FIGURE 12 is a sectional view taken along line F—F of FIG. 11 showing details of the inner structure.

FIGURE 13 is a diagrammatic drawing of an alternative structure for the upper end of the reach housing of the second preferred embodiment of this invention.

FIGURE 14 is a sectional view taken along lines G—G of FIGS. 13 and 17 showing details of the inner structure.

FIGURE 15 is a diagrammatic drawing of an alternative structure for the upper end of the reach housing of the second preferred embodiment of the invention.

FIGURE 16 is a sectional view taken along line H—H of FIG. 15 showing details of the inner structure.

FIGURE 17 is a diagrammatic drawing of an alternative structure for the eye and the upper end of the reach housing of the second preferred embodiment of this invention.

FIGURE 18 is a diagrammatic drawing of an alternative structure for the eye and the upper end of the reach housing of the second preferred embodiment of this invention.

FIGURE 19 is a sectional view taken along line I—I of FIG. 18 showing details of the inner structure.

FIGURE 20 is a diagrammatic drawing of an alternative structure for the upper end of the reach housing of the first preferred embodiment of this invention.

FIGURE 21 is a sectional view taken along lines J—J of FIGS. 20 and 22 showing details of the inner structure.

FIGURE 22 is a diagrammatic drawing of an alternative structure for the upper end of the reach housing of the second preferred embodiment of the invention.

FIGURE 23 is a diagrammatic drawing of an alternative structure for the eye in the first preferred embodiment of this invention.

FIGURE 24 is a diagrammatic drawing of an alternative structure for the eye in the second preferred embodiment of the invention.

FIGURE 25 is a sectional view taken along lines K—K of FIGS. 23 and 24 showing details of the inner structure.

In FIGURE 1, reach housing 1 is an elongated, non-conducting, stiff tube which may preferably be made from a section of so-called rigid plastic pipe or tube. In one preferred embodiment this reach tube 1 is about six feet in total length and is made from high impact polyvinyl chloride tubing 1 15/16 inch O.D. by 1½ inch I.D., although any convenient-to-handle length will suffice and any wall thickness which will impart a fairly high degree of stiffness and strength for rugged service will be satisfactory. The inside diameter of reach housing 1 must be large enough to receive the line 2 which is threaded through the longitudinal opening therein. The outside diameter of reach housing 1 should not be larger than what is convenient for a man's hand to grasp and hold firmly. Of course this reach housing 1 could have any shape other than tubular and could even have handles affixed thereto, but the essential qualities are that the structure be elongated, be made of relatively stiff material, be non-conducting, and have a longitudinal opening therethrough to receive line 2.

Line 2 is preferably a single or double braided line which is often referred to as a torque-free line. This type of line is especially well adapted for use in a reach pendant due to its freedom from the tendency to sustain horizontal cargo oscillations by twisting and untwisting during flight when the pendant is supporting an external cargo below a helicopter. The overall length of line 2 is a matter of choice, depending upon the particular requirements of the user, but in several preferred embodiments the length is thirteen, sixteen, or twenty feet.

Formed in one end of line 2 is eye 3, the converging portions of which 4 and 4' are maintained within a slightly flexible expansion sleeve 5 which is fitted to one end of reach housing 1. Sleeve 5 is made of reinforced neoprene rubber in one preferred embodiment of the invention and may be a section of neoprene tubing about 4½ inches long with an inside diameter just equal to the O.D. of reach housing 1 so that sleeve 5 may be expanded and forced over the upper end of reach housing 1 with cement applied to the mating surfaces, thereby producing a strong durable connection. The purpose of expansion sleeve 5 is to grasp and hold firmly at least parts of the converging portions 4 and 4' of eye 3. To hold these converging portions 4 and 4' firmly, sleeve 5 must be deformable so that its open end assumes a slightly flared configuration as shown in FIG. 1. When eye 3 is put under tension (when the reach pendant is supporting a load) the converging portions 4 and 4' will elongate and tend to pull away from sleeve 5. Conversely, when the tension on eye 3 is released, these converging portions 4 and 4' will contract and snap back into sleeve 5. It is for the purpose of absorbing such forces without cracking that expansion sleeve 5 is provided as an extension of reach housing 1.

Since the reach pendant of this invention is intended for rugged service in vertical replenishment operations, a high impact collar 6 may be provided at the end of reach housing 1 opposite expansion sleeve 5. The function of collar 6 is merely to absorb heavy impacts when reach housing 1 crashes against the deck of a supply vessel or other hard surface. Collar 6 is optional and may be omitted if reach housing 1 is sufficiently strong to absorb such impacts without cracking. The lower part of line 2 outside of reach housing 1 terminates in any suitable manner for attaching cargo, such as eye 7 which supports a conventional safety hook 8 for attachment to the ring into which conventional cargo slings are belayed in normal practice.

In one preferred embodiment of the invention, eye 3 is encased in a length of flexible, resilient tubing which is shown in FIG. 1 as transparent tubing 9. The converging portions 10 and 10' of this casing 9 follow converging portions 4 and 4' of eye 3 down into expansion sleeve 5. The function which the tubing 9 contributes in combination with eye 3 and expansion sleeve 5 is to support eye 3 in an upright position on top of reach housing 1 so that it will not flop over and be unmanageable as would happen if tubing 9 were not employed, and to maintain eye 3 automatically in an open configuration as shown, due to the natural tendency of tubing 9 to straighten itself. Tubing 9 must offer enough resistance to bending to have a tendency to straighten itself, thereby urging eye 3 into an open configuration. In one preferred embodiment of the invention, tubing 9 is a length of transparent or translucent polyvinyl chloride tubing 1 inch I.D. with a 3/16 inch wall.

Another essential feature which is necessary in order to provide the desired result of maintaining eye 3 erect on top of reach housing 1, is that sliding of housing 1 over line 2 must be prevented since, otherwise, the converging portions 4 and 4' of eye 3 and the converging portions 10 and 10' of the encasing tubing 9 would slip out of expansion sleeve 5 and the inherent flexibility of line 2 would permit eye 3 to flop over and hang down beside the reach housing 1, thereby becoming useless for its intended purpose.

Sliding of housing 1 over line 2 may be prevented by means of linkage between housing 1 and line 2 or between sleeve 5 and line 2. It is most advantageous to have the linkage as close to eye 3 as possible because this minimizes the need to allow for substantial elongation under tension of that portion of line 2 lying between eye 3 and said linkage. For example, if the linkage joining line 2 and housing 1 were close to collar 6, the elongation under tension of that portion of line 2 lying between said linkage and eye 3 would permit the converging portions 4 and 4' of eye 3 and the converging portions 10 and 10' of encasing tubing 9 to pull out of sleeve 5. When the load was released and line 2 contracted, eye 3 might not re-seat itself in sleeve 5 and damage might occur to the converging portions 10 and 10' of tubing 9. For these reasons, it is an advantage to have the linkage between housing 1 and line 2 as close to eye 3 as possible.

Several means for providing the desired linkage are illustrated in the drawings. For example, in FIGS. 1 and 3, a length of shock-cord 11 is passed through expansion sleeve 5, through housing 1 (over the lower end of which sleeve 5 has been fitted), through line 2, and out again through the other side of housing 1 and sleeve 5. Holes are drilled through sleeve 5 and housing 1 to accommodate cord 11. Cord 11 is secured around the outside of sleeve 5 by a knot which may be a series of hitches as shown in FIG. 1. The location where cord 11 penetrates line 2 is just below the place where converging portions 4 and 4' of eye 3 are spliced. The converging portions 10 and 10' of encasing tubing 9 follow converging portions 4 and 4' of eye 3 to top of the splice which is well within sleeve 5 just above the location where cord 11 penetrates line 2. Thus, even though one of the advantages of using shock-cord for the linkage between housing 1 and line 2 is its resilience under stress, the linkage is tight enough to prevent converging portions 4 and 4' and 10 and 10' from being pulled out of sleeve 5 when the reach pendant is under load-carrying tension.

In FIGS. 6 and 7, a plastic pin 12 is shown in approximately the same position occupied by cord 11 in FIGS. 1 and 3. This plastic pin 13 is nylon in one embodiment of the invention and is inserted through holes in sleeve 5 and housing 1 and is threaded through line 2 and is secured in place by nylon bolts 13 which are fused to pin 12 where it emerges on both sides of sleeve 5.

In FIGS. 8 and 9 a similar plastic pin 12 is shown inserted through expansion sleeve 5 and through converging portions 4 and 4' of eye 3 and converging portions 10 and 10' of encasing tubing 9. Holes are made in the upper end of sleeve 5 for this purpose and holes are punched in the proper positions in encasing tubing 9. Pin 12 is inserted through such holes and is threaded through both converging portions 4 and 4' of eye 3. Plastic bolts 13 are fused to pin 12 where it emerges on both sides of pin 5. In the embodiments shown in FIGS. 6, 7, 8, and 9, pin 12 has sufficient resilience to withstand sudden stress without breaking when the reach pendant is tensioned suddenly by lifting a heavy cargo.

FIGS. 20 and 21 show an embodiment of the invention similar to that shown in FIGS. 8 and 9 with the exception that here shock-cord 11 penetrates the upper end of expansion sleeve 5 instead of plastic pin 12. Cord 11 is inserted through holes in sleeve 5 and in converging portions 10 and 10' of tubing 9 and is threaded through converging portions 4 and 4' of eye 3.

FIGS. 2 and 4 show a second preferred embodiment of the invention in which expansion sleeve 5 is omitted and the upper end of reach housing 1 is flared as shown at 14 to match the divergence of portions 4 and 4' of eye 3 as they project out of flared end 14. In this embodiment of the invention, flared end 14 performs the function of expansion sleeve 5 in a different way. While expansion sleeve 5 holds eye 3 erect by virtue of its ability to deform to match the divergence of portions 4 and 4' of eye 3 while grasping these portions and the similar portions 10 and 10' of resilient encasing tubing 9, which serve to stiffen eye 3 and keep it from flopping over, while also automatically urging eye 3 into an open configuration; flared end 14 by virtue of its shape also grasps portions 4 and 4' of eye 3 and the encasing portions 10 and 10' of tubing 9 and holds encased eye 3 erect on top of reach housing 1.

In FIGS. 2 and 4 shock-cord 11 penetrates housing 1 on both sides, and is threaded through line 2, and is secured around the outside of housing 1 by a knot which may be a series of hitches as shown.

FIGS. 13 and 14 are similar to FIGS. 6 and 7 with the exception that expansion sleeve 5 is omitted and a reach housing 1 with flared end 14 is employed. Plastic pin 12 penetrates only housing 1, is threaded through line 2 and is locked in place by fusing plastic bolts 13 on both ends of pin 12 where it emerges from opposite sides of housing 1.

FIGS. 15 and 16 are similar to FIGS. 8 and 9 with the exception that expansion sleeve 5 is omitted and a reach housing 1 with flared end 14 is employed. Plastic pin 12 is inserted through holes in opposite sides of housing 1, through holes punched in converging portions 10 and 10' of encasing tubing 9, and is threaded through converging portions 4 and 4' of eye 3. Pin 12 is locked in place by plastic bolts 13 which are fused to opposite ends of pin 12 where it emerges from housing 1.

FIG. 22 is similar to FIGS. 20 and 21 except for the fact that expansion sleeve 5 is omitted and a reach housing 1 with flared end 14 employed. Shock-cord 11 is inserted through holes in the flared end 14 of reach housing 1, through holes punched in converging portions 10 and 10' of encasing tubing 9 and is threaded through converging portions 4 and 4' of eye 3. Cord 11 is secured around the outside of housing 1 by a knot which may be a series of hitches as shown.

In both preferred embodiments of the invention as shown in FIGS. 1 and 2 there is an alternative means for preventing sliding of housing 1 over line 2 which is shown as a line-stop or splice-knot 15. This splice knot 15 is also illustrated in the sectional view of FIG. 5 where its structure is made clear. In the preferred form of line-stop or splice-knot 15 a short length of shock-cord is threaded through line 2 where it emerges from either collar 6 or the lower end of reach housing 1 when no reinforcing collar is employed. This shock-cord is then secured around the outside of line 2 by a knot which may be a series of hitches as shown. Splice-knot 15 is not shown to scale in the drawings. The outside diameter of splice-knot 15 must be large enough to jam in the open end of collar 6 or alternatively, in the open end of reach housing 1 if no reinforcing collar is employed. Since housing 1 is prevented from sliding over line 2 by the jamming action of splice-knot 15 the essential linkage is thereby provided between line 2 and housing 1 which maintains eye 3 and its encasing tubing 9 in an erect position on top of housing 1 by preventing the converging portions 4 and 4' of eye 3 and 10 and 10' of tubing 9 from slipping out of sleeve 5 or flared end 14, whichever embodiment is employed.

It should be noted in this connection that the portion of line 2 between eye 3 and splice-knot 15 will stretch when the reach pendant is under load. Care must be taken to insure that the converging portions 4 and 4' of eye 3 and 10 and 10' of encasing tubing 9 penetrate sufficiently deeply into either sleeve 5 or flared end 14 so that the elongation of that portion of line 2 between eye 3 and splice-knot 15 when the reach pendant is under load is not sufficient to permit these converging portions of eye 3 and tubing 9 to slip out of sleeve 5 or flared end 14.

Some synthetic materials of which braided lines, like the preferred form of line 2, are made are known to exhibit a certain amount of "creep" or permanent elongation after prolonged use. When the linkage between housing 1 and line 2 takes the form of the splice-knot 15 or any other line-stop affixed to line 2 serving the same purpose, "creep" or permanent elongation of the portion of line 2 between eye 3 and splice-knot or line-stop 15 will be a disadvantage because it may allow sufficient "play" in this portion of line 2 to permit the converging portions of eye 3 and tubing 9 to slip out of sleeve 5 or flared end 14. In order to compensate in advance for such "creep" or permanent elongation of line 2, so that "play" will not develop in that portion of line 2 between eye 3 and line-stop or splice-knot 15, it is a preferred practice to place at least this portion of line 2 under heavy tension before line-stop or splice-knot 15 is affixed to line 2. Thus, that portion of line 2 between eye 3 and line-stop or splice knot 15 is thereby pre-tensioned to such a degree that, whatever "creep" or permanent elongation occurs, a detrimental amount of "play" will not be produced in that portion of line 2.

Although FIGS. 1 and 2 each show structures in which two forms of linkage are employed at the same time to prevent sliding of reach housing 1 over line 2, it is not intended that both linkages must be used in any given reach pendant. Either the preferred upper linkage may be used alone in one of its alternative embodiments, such as the shock-cord 11 penetrating sleeve 5, housing 1, and line 2, or else the lower linkage such as line-stop or splice-knot 15 may be used alone. Any one of the types of linkage described and illustrated herein may be used alone or in combination with a second linkage to provide fail-safe performance. The present inventor has found it to be desirable in some categories or service in which his reach pendants are employed, to use a combination of linkages such as are shown in FIGS. 1 and 2. One small additional advantage of using a line-stop or splice-knot 15 is that this stop or knot will absorb impacts when the lower end of reach housing 1 or collar 6 strikes a deck or the ground. When used in combination with one of the alternative forms of the upper linkage, the splice-knot 15 adds the security of fail-safe performance plus the added feature of its ability to cushion impacts against the lower end of the reach pendant.

In every figure in which shock-cord 11 is illustrated as employed to provide a linkage between housing 1 or sleeve 5 and line 2, a loop 16 is shown hanging beneath the knot which secures cord 11 around the outside of housing 1 or sleeve 5. This loop 16 is a purely optional accessory whose only purpose is to provide a convenient attachment for safety hook 8 to be snapped into when the reach pendant is not in use and convenience in handling or stowage is desired.

FIG. 10 illustrates an alternative form of casing which may be used in lieu of tubing 9 to stiffen and hold eye 3 in an erect position and, simultaneously, to urge eye 3 automatically into an open configuration when not under tension. In this alternative form of casing, tubing 9 is replaced by thimble 17 which is made from a sheet of flexible, resilient material, preferably platsic, having inherent ability to resist deformation and to return to its original shape after flexure. The rectangular sheet from which thimble 17 is made is first molded with a longitudinal groove having a radius approximately equal to that of line 2. Then this grooved sheet is bent and installed under flexure in eye 3. The sheets inherent resistance to deformation in flexure gives it the tendency to try to straighten itself. The force thus exerted urges eye 3 into an open configuration and keeps it that way whenever the eye is not under tension.

In the embodiment illustrated in FIG. 10 the essential linkage which prevents reach housing 1 from sliding over line 2 is a plastic pin 12 which penetrates expansion sleeve 5, housing 1, is threaded through line 2, and is locked on opposite sides of sleeve 5 by nuts 13 which are fused on pin 12. This embodiment is similar to that shown in FIGS. 6 and 7 with the sole exception that tubing 9 has been replaced by resilient thimble 17.

FIGS. 11 and 12 illustrate an embodiment of the invention similar to that of FIGS. 8 and 9 with the sole exception that tubing 9 has been replaced by resilient thimble 17. In FIGS. 11 and 12 plastic pin 12 penetrates expansion sleeve 5 and is threaded through converging portions 4 and 4' of eye 3 and penetrates converging portions 18 and 18' of thimble 17. Pin 12 is locked on opposite sides of sleeve 5 by nuts 13 which are fused on pin 12.

FIG. 17 illustrates an embodiment similar to that of FIGS. 13 and 14 wherein no expansion sleeve 5 is employed and a reach housing with flared end 14 is used. The only change is that tubing 9 has again been replaced by thimble 17.

In the embodiment illustrated in FIGS. 18 and 19, we have a structure similar to that of FIGS. 15 and 16 with the sole exception that tubing 9 has been replaced by thimble 17.

The same applies to FIG. 23 which is similar to FIGS. 20 and 21 except for the fact that here too, tubing 9 has been replaced by thimble 17.

FIGS. 24 and 25 are the exact counterparts of FIGS. 22 and 21 with the sole exception that tubing 9 has been replaced by thimble 17.

Thimble 17 is shown in FIGS. 10, 11, 12, 17, 18, 19, 23, 24, and 25 as an illustration of an alternative structure to tubing 9 as used in every other figure in the drawings. The essential similarity in function and result is that both tubing 9 and thimble 17 have the inherent tendency when bent into flexure to be self-straightening and, thereby, to urge eye 3 automatically into an open configuration and to hold it open when eye 3 is not under tension.

The second similarity in function and result between tubing 9 and thimble 17 is that both have relatively stiff converging portions 10 and 10' and 18 and 18', respectively, which are maintained within expansion sleeve 5 or, alternatively, within flared end 14 of reach housing 1, thereby holding eye 3 in an erect position on top of housing 1, ready for rapid and accurate engagement with the external cargo hook of a hovering aircraft.

What I claim is:

1. A reach pendant for attaching a cargo to a hovering aircraft comprising the combination of an elongated, relatively stiff, non-conducting housing having a longitudinal opening therethrough, an expansion sleeve fitted to one end of said housing, a length of line threaded through said opening in said housing, an eye in one end of said line adjacent said sleeve, a length of resilient, flexible tubing encasing the line defining said eye, whereby the tendency of said tubing to straighten itself urges said eye into an open configuration when said eye is not under tension; at least parts of the converging portions of said eye, and the tubing encasing said converging portions, being disposed within said sleeve; and means for preventing sliding of said housing over said line, whereby said parts of said converging portions of said eye are prevented from sliding out of said sleeve.

2. The structure of claim 1 in which said means is a pin which penetrates said expansion sleeve, said converging portions of said eye, and the tubing encasing said portions.

3. The structure of claim 1 in which said means is a length of cord which penetrates said expansion sleeve, said converging portions of said eye, and the tubing encasing said portions; said cord being secured around said sleeve by a knot.

4. The structure of claim 1 in which said means is a pin which penetrates said expansion sleeve, said reach housing, and said line.

5. The structure of claim 1 in which said means is a length of cord which penetrates said expansion sleeve, said reach housing, and said line; said cord being secured around said housing by a knot.

6. The structure of claim 1 in which said means is a splice-knot affixed to said line where said line emerges from the end of said reach housing opposite said sleeve, thereby preventing said housing from sliding over said line far enough to allow said converging portions of said eye, and the tubing encasing said portions, to slip out of said sleeve.

7. The structure of claim 6 wherein said splice-knot is affixed to said line while at least the portion of said line within said reach housing is maintained under tension.

8. A reach pendant for attaching a cargo to a hovering aircraft comprising the combination of an elongated, relatively stiff, nonconducting housing having a longitudinal opening therethrough, an expansion sleeve fitted to one end of said housing, a length of line threaded through said opening in said housing, an eye in one end of said line adjacent said sleeve, a thimble made of flexible, resilient material disposed within said eye, whereby the tendency of said thimble to straighten itself urges said eye into an open configuration when said eye is not under tension; at least parts of the converging portions of said eye, and the parts of said thimble located within said converging portions, being disposed within said sleeve; and means for preventing sliding of said housing over said line, whereby said parts of said converging portions of said eye are prevented from sliding out of said sleeve.

9. The structure of claim 8 in which said means is a pin which penetrates said expansion sleeve, said converging portions of said eye, and the parts of said thimble disposed between said converging portions.

10. The structure of claim 8 in which said means is a length of cord which penetrates said expansion sleeve, said converging portions of said eye, and the parts of said thimble disposed between said converging portions; said cord being secured around said sleeve by a knot.

11. The structure of claim 8 in which said means is a pin which penetrates said expansion sleeve, said reach housing, and said line.

12. A reach pendant for attaching a cargo to a hovering aircraft comprising the combination of an elongated, relatively stiff, non-conducting housing having a longitudinal opening therethrough, a flared end on said housing, a length of line threaded through said opening in said housing, an eye in one end of said line adjacent said flared end, a length of resilient, flexible tubing encasing the line defining said eye, whereby the tendency of said tubing to straighten itself urges said eye into an open configuration when said eye is not under tension; at least parts of the converging portions of said eye, and tubing encasing said portions, being disposed within said flared end; and means for preventing sliding of said housing over said line, whereby said parts of said converging portions of said eye are prevented from sliding out of said sleeve.

13. The structure of claim 12 in which said means is a pin which penetrates said housing, said converging portions of said eye and the tubing encasing said portions.

14. The structure of claim 12 in which said means is a length of cord which penetrates said housing, said converging portions of said eye and the tubing encasing said portions; said cord being secured around said housing by a knot.

15. The structure of claim 12 in which said means is a pin which penetrates said housing and said line.

16. The structure of claim 12 in which said means is a splice-knot affixed to said line where said line emerges from the end of said reach housing opposite said flared end, thereby preventing said housing from sliding over said line far enough to allow said parts of said converging portions of said eye, and the tubing encasing said portions, to slip out of said flared end.

17. The structure of claim 16 wherein said splice-knot is affixed to said line while at least the portion of said line within said reach housing is maintained under tension.

18. A reach pendant for attaching a cargo to a hovering aircraft comprising the combination of an elongated, relatively stiff, non-conducting housing having a longitudinal opening therethrough, a flared end on said housing, a length of line threaded through said opening in said housing, an eye in one end of said line adjacent said flared end, a thimble made of flexible, resilient material disposed within said eye, whereby the tendency of said thimble to straighten itself urges said eye into an open configuration when said eye is not under tension; at least parts of the converging portions of said eye, and the parts of the thimble located within said portions, being disposed within said flared end; and means for preventing sliding of said housing over said line, whereby said converging portions of said eye are prevented from sliding out of said flared end.

19. The structure of claim 18 in which said means is a pin which penetrates said housing, said converging portions of said eye and the parts of said thimble disposed between said converging portions.

20. The structure of claim 18 in which said means is a length of cord which penetrates said housing, said converging portions of said eye, and the parts of said thimble between said converging portions.

21. The structure of claim 18 in which said means is a pin which penetrates said housing and said line.

References Cited by the Examiner
UNITED STATES PATENTS

| | | | |
|---|---|---|---|
| 1,475,859 | 11/1923 | Nyman | 294—74 X |
| 3,079,192 | 2/1963 | Otley | 294—74 |

GERALD M. FORLENZA, *Primary Examiner.*

G. F. ABRAHAM, *Assistant Examiner.*